Figure 21:
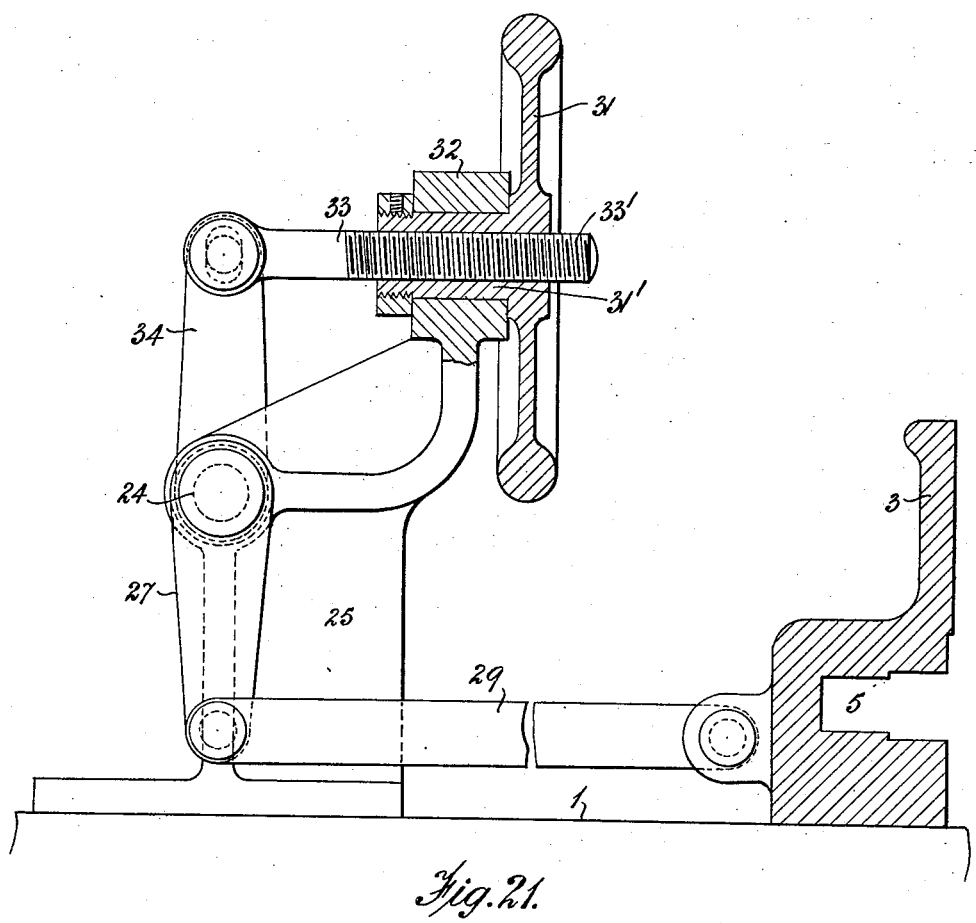

H. ATKINSON.
CHAIN FEED MECHANISM FOR USE WITH SAW BENCHES AND OTHER CUTTING MACHINERY.
APPLICATION FILED APR. 29, 1911.
1,033,295.
Patented July 23, 1912.
6 SHEETS—SHEET 1.
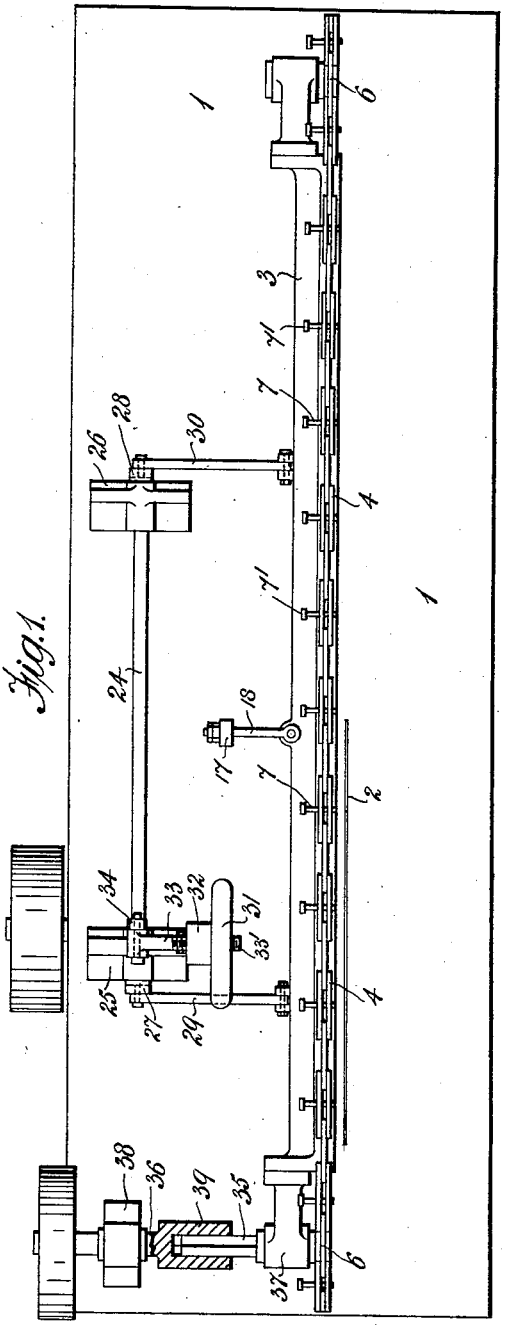
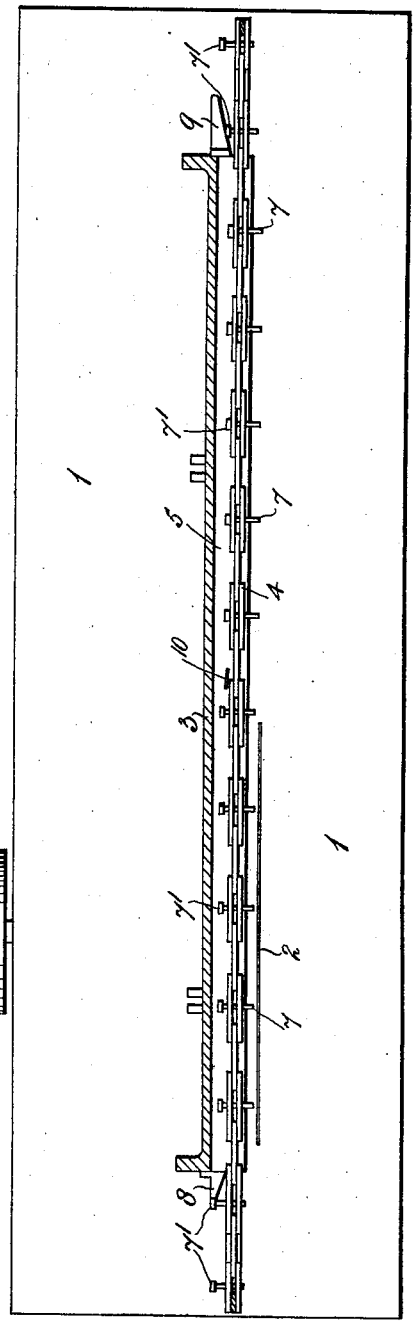
WITNESSES:
INVENTOR:
Henry Atkinson
BY
ATTY

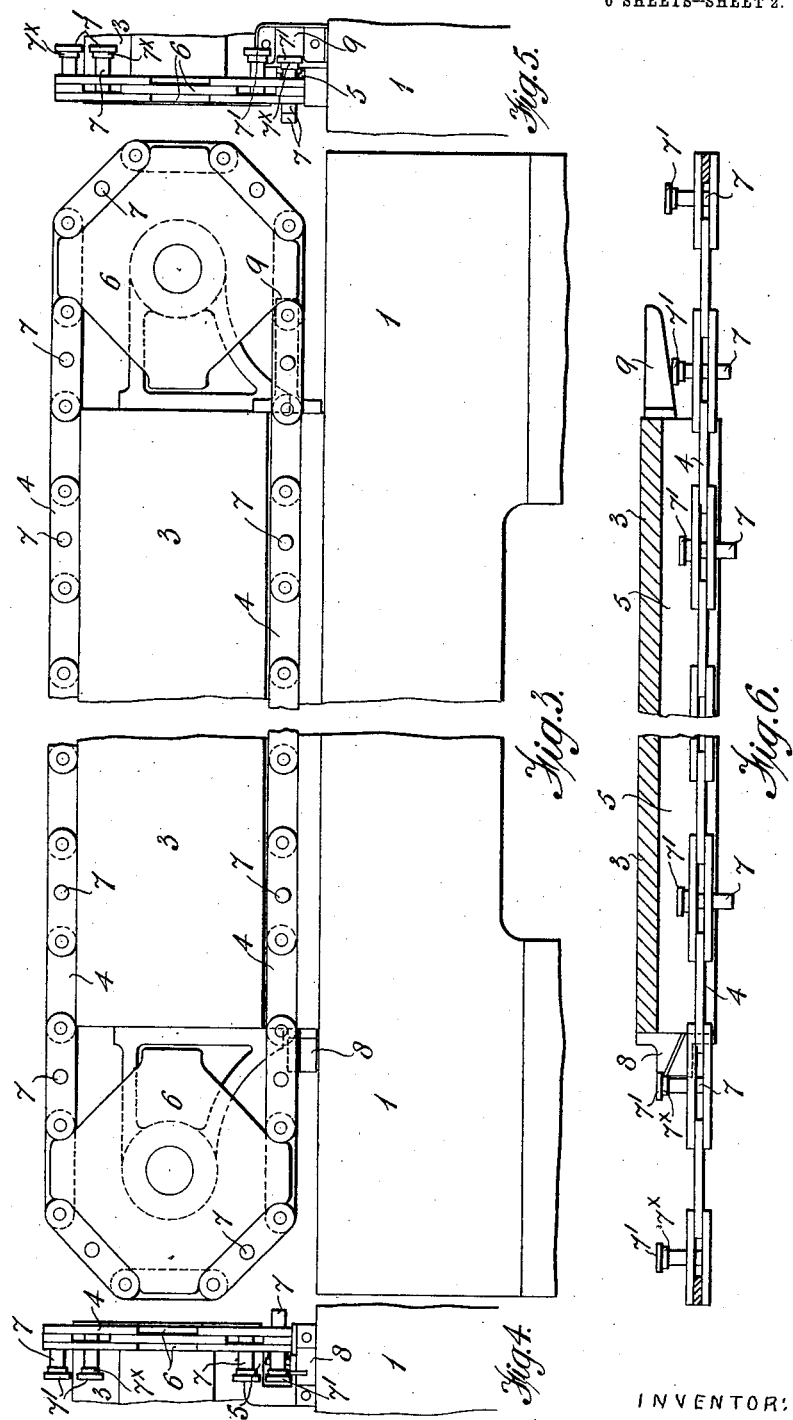

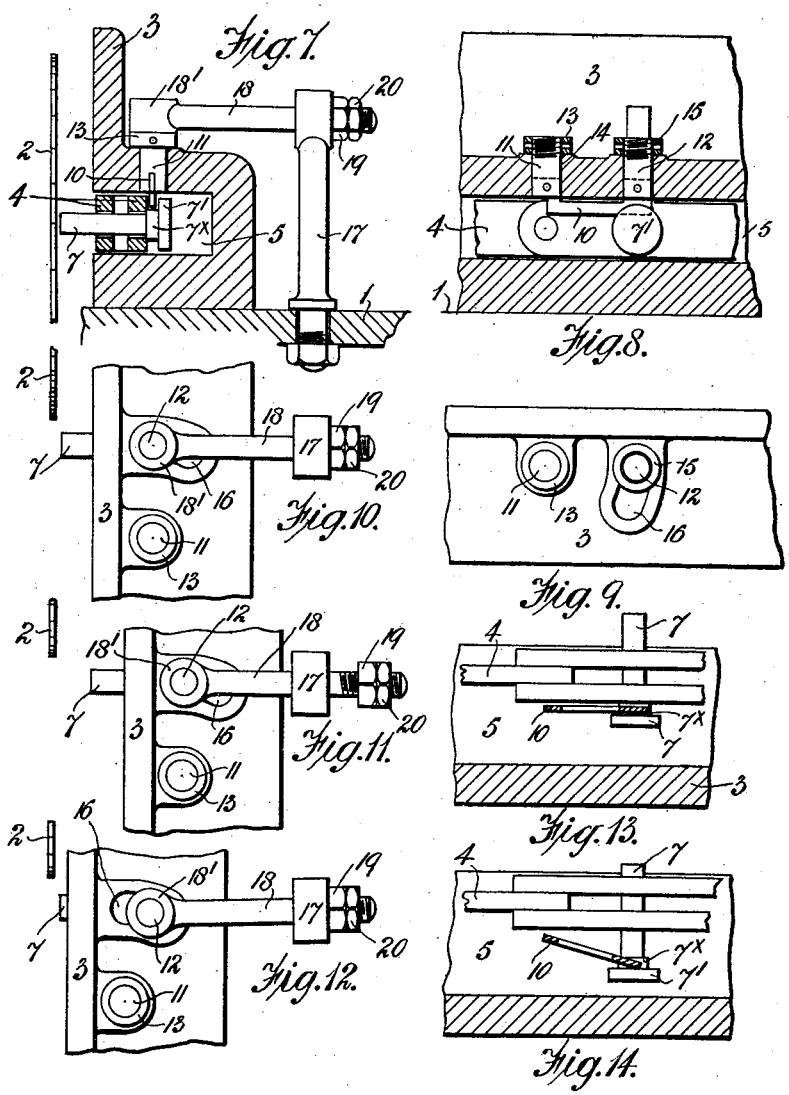

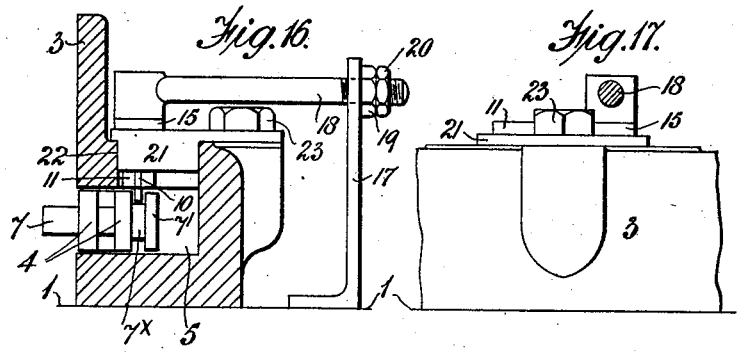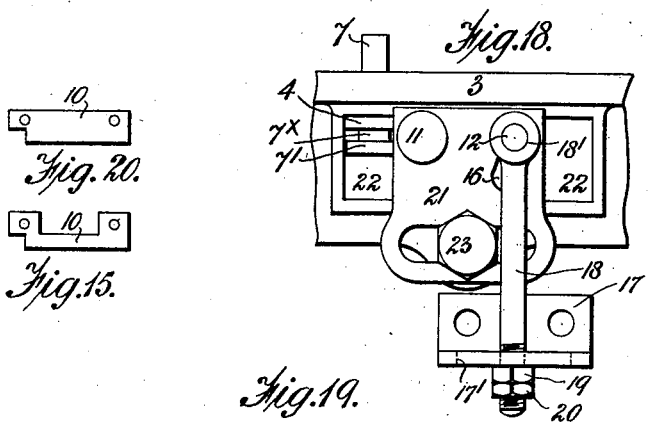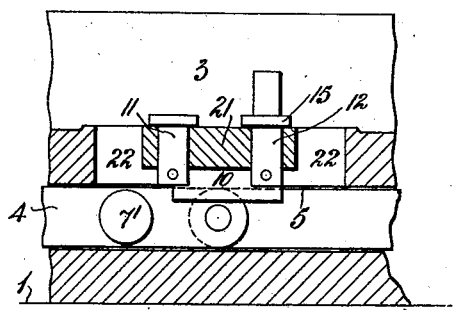

H. ATKINSON.
CHAIN FEED MECHANISM FOR USE WITH SAW BENCHES AND OTHER CUTTING MACHINERY.
APPLICATION FILED APR. 29, 1911.

1,033,295.    Patented July 23, 1912.

H. ATKINSON.
CHAIN FEED MECHANISM FOR USE WITH SAW BENCHES AND OTHER CUTTING MACHINERY.
APPLICATION FILED APR. 29, 1911.

1,033,295.

Patented July 23, 1912.

6 SHEETS—SHEET 6.

WITNESSES:
John C. Sanders
Leon Spring

INVENTOR:
Henry Atkinson
BY
ATTY.

UNITED STATES PATENT OFFICE.

HENRY ATKINSON, OF SOUTH NORWOOD, ENGLAND.

CHAIN FEED MECHANISM FOR USE WITH SAW-BENCHES AND OTHER CUTTING MACHINERY.

1,033,295.  Specification of Letters Patent.  Patented July 23, 1912.

Application filed April 29, 1911. Serial No. 624,115.

*To all whom it may concern:*

Be it known that I, HENRY ATKINSON, a subject of the King of Great Britain and Ireland, residing at 16 Queen's road, South Norwood, in the county of Surrey, England, have invented new and useful Improvements in Chain Feed Mechanism for Use with Saw-Benches and other Cutting Machinery, of which the following is a specification.

The invention relates to chain feed mechanism for use with saw benches, band saws and other cutting machinery and consists of improvements in that type of feed mechanism in which a chain travels in a channel or guide formed in the fence and is provided at intervals with projecting studs by means of which the wood or other material to be sawed or cut is fed to the circular saw or the like. According to present practice these studs are screwed into the links of the chain and as a result such chain feeds are far from satisactory in practice. Examples of the defects of such a chain feed mechanism are as follows: As the studs are fixed it is obvious that the minimum thickness of board or the like which it is possible to cut is limited by the extent to which the studs project beyond the front face of the fence, and as the thickness of board or the like is increased there is a proportionate tendency for the wood or the like, owing to the stud pressing against only a small part of the back of the wood or the like, to be moved away from the fence, a tendency which would not obtain if the extent by which the studs projected varied in accordance with the thickness of board or the like to be cut. Again it is necessary when cutting a piece of wood or the like of greater length than that which has just been cut to remove a number of studs from the chain.

The objects of my invention are to obviate the above described and other defects and generally to enhance the efficiency of such feed mechanisms.

When my invention is applied to an ordinary saw bench and the feed chain passes around chain wheels located above the bench proper and in front of and in rear of the saw the parts of the invention may be arranged in the manner now to be described.

The chain is provided at intervals with studs which are slidably mounted in the links of the chain. The studs, which may be prevented by any suitable means from becoming detached from the chain, are formed at their inner ends with heads and with shoulders immediately in front of said heads. A plate inclined at an angle to the chain is secured to the rear end of the fence in such a position that the head of each stud will, after it has passed the saw, come in contact with the innermost end of said inclined plate and by passing along the outer inclined surface thereof will be withdrawn so that it no longer projects beyond the chain. A second but oppositely arranged inclined plate is secured to the front end of the fence and causes each stud to be pushed out so as to be ready to feed a strip or block of wood toward the saw. The fence is further provided intermediate between the two fixed inclined plates and at a point near to, but in front of, the saw with a fixed or adjustable plate by means of which each stud is withdrawn to the required extent before it reaches the saw. This plate, may, in cases where only one size of saw is used, be in a position relatively fixed as regards the axis of the saw, or may, in cases where saws of different diameters are used, be arranged so as to be adjustable toward or away from the axis of the saw.

The above described features of the invention as well as other embodiments thereof will be fully described by reference to the accompanying drawings, which will enable persons versed in the art to make any alterations which may be necessary to meet the exigencies of any particular case.

Figure 22:
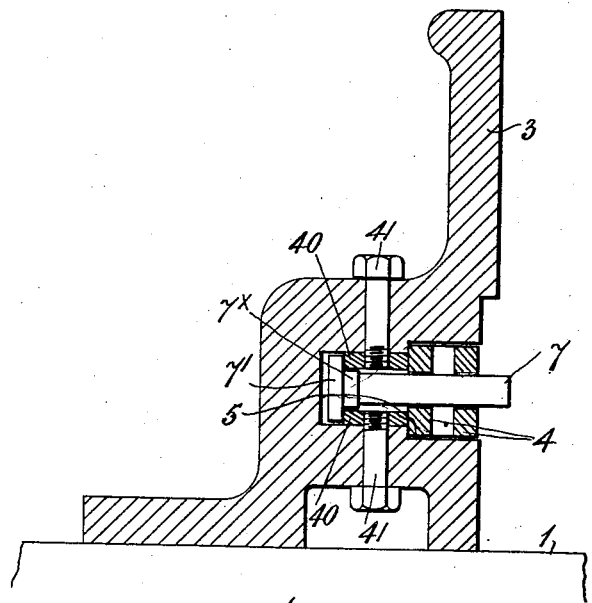
Figure 23:
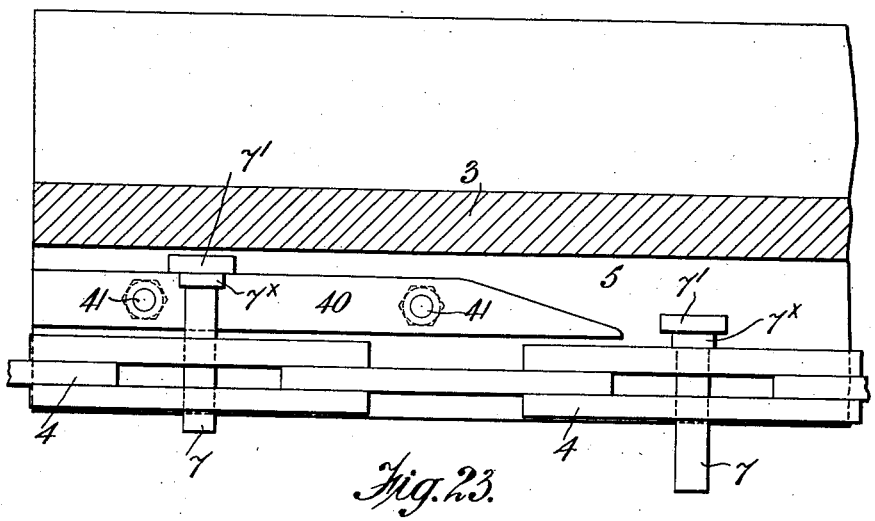

Figure 1 is a plan of a saw bench provided with one embodiment of my invention, the studs of the lower half of the feed chain being omitted for the sake of clearness. Fig. 2 is a second plan of said saw bench, in which the fence is shown in horizontal section and some of the parts shown in Fig. 1 are omitted. Fig. 3 is an elevation, on an enlarged scale, of the two ends of the fence and part of the bench. Figs. 4 and 5 are end views, drawn to the same scale as Fig. 3, of part of the fence and bench, viewed from the left and right of Fig. 3. Fig. 6 is a horizontal section of Fig. 3, the section being taken through the channel or guide formed in the lower part of the fence for the reception of the feed chain. Fig. 7 is a transverse vertical section and Fig. 8 is a longitudinal vertical section through the fence and part of the bench, showing the intermediate plate by means of which the studs are withdrawn just before they reach the saw. Fig. 9 is a plan of part of the fence, which has been added for the purpose of illustrating certain details of construction. Figs. 10, 11 and 12 are plans illustrating the parts shown in Fig. 7 adjusted to different positions according to the thickness of board to be cut. Figs. 13 and 14 are horizontal sections through the fence, illustrating the positions of the intermediate plate when the positions of parts are as in Figs. 11 and 12. Fig. 15 is a view of the plate shown in the preceding figures. Fig. 16 is a transverse vertical section through the fence, Fig. 17 is a front elevation, Fig. 18 is a plan and Fig. 19 is a longitudinal section of the fence showing how the embodiment illustrated by the preceding figures would be modified when it is necessary that the intermediate plate shall be movable so as to allow of saws of different diameters being used on the same bench. Fig. 20 is a view of the adjustable plate used in such modification. Fig. 21 is a transverse section illustrating in detail and to an enlarged scale the mechanism shown in Figs. 1 and 2 by which the fence may be moved toward or away from the saw. Figs. 22 and 23 are respectively a transverse vertical section and a horizontal section illustrating a modification.

Referring now to these drawings, 1 is the saw bench, 2 is the circular saw, and 3 is the fence which is adjusted toward and away from the saw according to the thickness of strip to be cut.

4 is the feed chain traveling in the channel or guide 5 formed in the fence 3 and passing around the chain wheels 6. The wheels 6 are rotated in the usual manner and are adapted to be moved together with the fence toward and away from the saw 2 by any suitable disposition and arrangement of parts.

All of the above enumerated parts are well known and form no novel feature of the present invention.

Referring now to the parts of the present invention, as illustrated by Figs. 1 to 21, 4 is the chain provided at suitable intervals with studs 7. The studs 7 are slidably mounted in the double links of the chain 4 and are provided with heads 7' and with shoulders 7ˣ. 8 is the fixed inclined plate, secured to the rear end of the fence 3, by means of which the studs 7 are successively withdraw after they have passed beyond the saw, and 9 is the fixed inclined plate, secured to the front end of the fence 3, by means of which each stud, previously withdrawn by the fixed plate 8, is pushed out for the purpose of feeding the wood toward the saw. 10 is the intermediate plate which is adapted to be adjusted in such manner that each projected stud 7 will, just before it reaches the saw, be retracted to an extent which, while insuring that the wood shall be fed toward the saw, will allow the studs 7 to pass along at the side of the saw between the saw and the fence.

Referring first to the arrangement of adjustable plate shown in Fig. 2 and Figs. 7 to 14, it will be seen that the plate 10 consists of a strip of suitably hardened steel which is pinned to two studs 11 and 12. The stud 11 is rotatably secured by means of a nut 13 in a bearing 14 formed in the upper wall of the fence 3. The stud 12, which is made of greater length than the stud 11 and is provided with a nut 15, passes through a curved slot 16 formed in the upper wall of the fence 3 and struck from the center of the bearing 14. The position of the stud 12 in its curved slot 16 is altered, so as to determine the inclination of the adjustable plate 10 and the extent to which the studs will be withdrawn when the fence is secured in any position, by means of a pillar or standard 17, a bolt 18 passing through an eye in the upper end of the pillar 17 and formed with an eye 18', which fits the upper end of the stud 12, and nuts 19 and 20 engaging with a screw thread formed on the outer end of the eye bolt 18.

When saws of different diameters are used on the same bench it is necessary that the position of the plate 10 shall be adjusted in the direction of the length of the fence 3. The bearing 14 for the stud 11 and the curved slot 16 for the stud 12 can then, as shown in Figs. 16 to 19, be formed in a plate 21 which is slidably mounted in a slot 22 formed in the upper wall of the fence 3 and is adapted to be secured in its adjusted position in said slot by means of a screwed pin 23. In this case the pillar or standard 17 would either be made adjustable or would, as shown, be fixed and be provided with a slot 17'.

The action of the parts is as follows:—As the chain 4 travels forward and reaches the rear end of the fence 3 the heads 7' of the then projecting studs 7 will successively come in contact with the inclined plate 8 and will, as shown in Figs. 2, 4 and 6, be drawn back so that they no longer project beyond the front of the chain 4. The studs 7 are then carried by the chain 4 toward the near end of the fence 3 when their heads will come in contact with the inclined plate 9 and be forced outward. As the studs 7 approach the saw 2 their heads will come in contact with the adjustable plate 10 which will, if it is in an inclined position, vary the extent to which the studs will project as they pass the saw. The piece of wood to be cut is placed in the usual way against the fence 3 and if of a length greater than the distance between two of the studs 7 obtaining in the length of chain between the fixed plate 9 and the adjustable plate 10 one or more of these studs will be pushed inward by the wood, after which the piece of wood will be carried forward by the next stud in rear of said piece.

Important advantages arising from the fact that the eye bolt 18 passes loosely through an eye or slot formed in the upper end of the pillar 17 and that the stud 12 passes through the curved slot 16 are that on the one hand the fence 3 can be moved to a considerable distance away from the saw 2 without decreasing the maximum extent by which the studs 7 project beyond the fence, while on the other hand when the fence is moved toward the saw 2 the distance by which the studs project beyond the fence will, owing to the nuts 19 and 20 coming against the pillar 17, be automatically varied according to the thickness of the strip to be cut. As a result of the action of the above described parts and the fact that the chain moves with the fence, it is possible by the use of my invention, apart from other advantages, to cut a very considerable range of thicknesses of boards or the like. This will be evident from a consideration firstly of Figs. 10, 11 and 13 and then of Figs. 12 and 14. In Fig. 10 the studs are shown as projecting to the maximum extent, a state of affairs which will obtain, as evident from an inspection of Fig. 11, until such time as the fence 3 comes in contact with the pillar 17. During the whole of this time the adjustable plate 10 will remain parallel to the front of the fence and since the feed chain is arranged parallel thereto and moves therewith, there will be no withdrawal of the studs. When, on the contrary, the fence 3 is moved from the position shown in Fig. 10 toward the saw 2 the stud 12 will pass along the curved slot 16 with the result that the inclination of the plate 10 will be varied and the studs 7 be withdrawn to an extent corresponding to the reduced thickness of board required, although they will always project to an extent which will be sufficient to carry a piece of wood forward. This will be evident from an inspection of Figs. 12 and 14 which respectively illustrate the fence adjusted so that a strip of reduced thickness may be cut and the corresponding inclination of the plate 10.

As already mentioned the fence 3 and the chain 4 are simultaneously moved toward or away from the saw 2 by any suitable mechanism, the arrangement of parts being such that there is no break in the drive of the feed chain. An example of suitable mechanism for effecting these objects is that illustrated by Figs. 1, 2 and 21 and now to be described. 24 is a rock shaft which is mounted in brackets 25 and 26 fixed to the bench 1, and 27 and 28 are arms secured to the ends of the rock shaft 24 and connected by means of links 29 and 30 to the fence 3. 31 is a hand wheel which is rotatably mounted in a bearing 32 forming part of the bracket 25. The hand wheel 31 is provided with a screwed hub 31', and this screwed hub engages with a thread 33' formed on the inner half of a rod 33. The rod 33 is connected at its outer end to a third arm 34 fixed to the rock shaft 24. The shaft by which the chain wheel at the rear end of the fence 3 is driven is formed in two parts 35 and 36, which respectively rotate in a bearing 37 secured to the fence 3, and a bracket 38, fixed to the bench 1. The two halves 35 and 36 of the shaft by which the rear chain wheel is driven are connected to one another by means of a sleeve 39 secured to the half 36 of said shaft and sliding on a squared part of the other half 35 thereof.

If desired the intermediate plate instead of being adjustable, so as to vary the extent to which the studs are withdrawn as they approach the saw or the like, may be fixedly secured to the fence. In this case as shown in Figs. 22 and 23 two strips 40, secured by screws 41 to the fence 3, would be used.

Although the invention has been described and illustrated in its application to a saw bench in which the feed chain is located at the side of the saw and extends beyond the front and rear of the saw and is arranged wholly above the bench proper, a feed chain provided with slidable studs could also be applied to saw benches in which the feed chain is arranged differently from that shown and also to other cutting machinery. For instance, if the feed chain was disposed at the side of the saw and extended beyond the front and rear of the saw but instead of returning above the bench, as shown, returned below the bench then only the front plate 9 and the intermediate plate 10 would be necessary. If the feed chain were arranged in front of the saw and wholly above the bench then only the rear and front plates 8 and 9 would be used, while if the chain were in front of the saw and returned below the bench then only the first plate would be employed.

Having now described my invention what I have invented and desire to secure by Letters Patent of the United States is as follows:—

1. In a saw bench or other cutting machine, the combination of a fence, an endless feed chain traveling in a channel formed in the front part of the fence, feed studs slidably mounted in the links of the feed chain, heads formed on the rear ends of the feed studs, and plates located at the front end of the fence and intermediate between the ends of the fence and adapted to coact with the heads on the rear ends of the feed studs, substantially as described.

2. In a saw bench or other cutting machine, the combination of a fence, an endless feed chain traveling in a channel formed in the front part of the fence, feed studs slidingly mounted in the links of the feed chain, heads formed on the rear ends of the feed studs, a fixed plate secured to the front end of the fence and adapted to coact with the heads formed on the rear ends of the feed studs, and an adjustable plate located intermediate between the ends of the fence and adapted to have its inclination toward the feed chain and in the direction of the travel of said chain varied, substantially as described.

3. In a saw bench or other cutting machine, the combination of a fence, an endless feed chain traveling in a channel formed in the front part of the fence, feed studs slidably mounted in the links of the feed chain, heads formed on the rear ends of the feed studs, and plates located at the front end of the fence, intermediate between the ends of the fence and at the rear end of the fence and adapted to coact with the heads on the rear ends of the feed studs, substantially as described.

4. In a saw bench or other cutting machine, the combination of a fence, an endless feed chain traveling in a channel formed in the front part of the fence, feed studs slidably mounted in the links of the feed chain, heads formed on the rear ends of the feed studs, plates fixed to the front and rear ends of the fence and adapted to coact with the heads formed on the rear ends of the feed studs, and a plate arranged on the fence intermediate between its ends and adapted to coact with the heads on the rear ends of the feed studs and to have its inclination toward the feed chain and in the direction of the travel of said chain varied, substantially as described.

5. In a saw bench or other cutting machine the combination of a fence, an endless feed chain traveling in a channel formed in the front part of the fence, feed studs slidably mounted in the links of the feed chain, heads formed on the rear ends of the feed studs, a fixed plate located at the front end of the fence, and an adjustable plate located intermediate between the ends of the fence and consisting of a metal strip secured at one of its ends to a stud rotatably mounted in a bearing provided on the fence and secured at its other end to a second stud passing through and adapted to be secured in adjusted position in a curved slot provided on the fence, substantially as described.

6. In a saw bench or other cutting machine, the combination of a fence, an endless feed chain traveling in a channel formed in the front part of the fence, feed studs slidably mounted in the links of the feed chain, heads formed on the rear ends of the feed studs, a fixed plate located at the front end of the fence, an adjustable plate located intermediate between the ends of the fence and consisting of a metal strip secured at one of its ends to a stud rotatably mounted in a bearing provided on the fence and secured at its other end to a second stud passing through a curved slot provided on the fence, a pillar secured to the bench of the machine in proximity to the back of the fence and formed at its upper end with a hole, a screwed bolt passing through the hole formed in said pillar and provided at its front with an eye fitting the upper end of said second stud, and nuts engaging with said screwed bolt, substantially as described.

In testimony whereof I have signed my name to this specification in the presence of two subscribing witnesses.

HENRY ATKINSON.

Witnesses:
ARTHUR F. ENNIS,
C. P. LEDDON.

---

Copies of this patent may be obtained for five cents each, by addressing the "Commissioner of Patents, Washington, D. C."